United States Patent [19]

Beutin et al.

[11] Patent Number: 4,869,480
[45] Date of Patent: Sep. 26, 1989

[54] STABILIZER FOR MOTOR VEHICLES WITH ELASTICALLY COMPLIANT LONGITUDINAL STABILIZER MEMBER

[75] Inventors: Ulrich Beutin, Weinstadt; Richard Korte, Attendorn; Jürgen Wehr, Stuttgart, all of Fed. Rep. of Germany

[73] Assignee: Daimler-Benz Aktiengesellschaft, Stuttgart, Fed. Rep. of Germany

[21] Appl. No.: 242,808

[22] Filed: Sep. 12, 1988

[30] Foreign Application Priority Data

Sep. 10, 1987 [DE] Fed. Rep. of Germany ....... 3730334

[51] Int. Cl.$^4$ .................. B60G 11/18; B60G 21/04; F16F 1/14
[52] U.S. Cl. .................................. 267/273; 267/154; 280/723
[58] Field of Search ................. 267/188-191, 267/273, 274, 154-157, 277; 280/665, 689, 721, 723, 722, 700, 717, 133, 134

[56] References Cited

U.S. PATENT DOCUMENTS

| | | | |
|---|---|---|---|
| 2,254,325 | 9/1941 | Slack et al. | 280/665 X |
| 2,660,449 | 11/1953 | MacPherson | 280/665 |
| 2,961,253 | 11/1960 | Allison | 267/188 X |
| 3,540,714 | 11/1970 | Mueller | 267/188 X |
| 3,724,869 | 4/1973 | Allison | 267/188 X |
| 3,767,224 | 10/1973 | Schneeweiss | 280/723 |
| 4,022,494 | 5/1977 | Allison | 267/188 X |
| 4,231,555 | 11/1980 | Saito | 267/154 |
| 4,232,881 | 11/1980 | Kölbel et al. | 267/188 X |
| 4,469,349 | 9/1984 | Tomita et al. | 267/273 X |
| 4,486,030 | 12/1984 | Takata et al. | 280/723 X |
| 4,491,342 | 1/1985 | Aubry | 267/154 X |
| 4,521,033 | 6/1985 | Lenhard-Backhos et al. | 267/273 X |
| 4,625,995 | 12/1986 | Aubry et al. | 280/723 |
| 4,637,628 | 1/1987 | Perkins | 280/723 X |
| 4,700,796 | 10/1987 | Morlok et al. | 280/723 X |
| 4,765,650 | 8/1988 | Kameshima et al. | 280/723 |
| 4,781,364 | 11/1988 | Finn et al. | 267/273 X |
| 4,784,406 | 11/1988 | Stinson | 280/723 X |

FOREIGN PATENT DOCUMENTS

| | | | |
|---|---|---|---|
| 2934295 | 3/1981 | Fed. Rep. of Germany | 267/273 |
| 3737735 | 6/1988 | Fed. Rep. of Germany | 267/154 |
| 1059894 | 2/1973 | France | 280/723 |
| 2451853 | 11/1980 | France | 267/154 |
| 0013148 | 1/1984 | Japan | 267/154 |

*Primary Examiner*—Douglas C. Butler
*Attorney, Agent, or Firm*—Barnes & Thornburg

[57] ABSTRACT

A stabilizer, formed by a torsion bar and stabilizer bar member's arranged at the end of the torsion bar, is designed in such a way that it is possible to dispense with the use of appropriate connection linkages for the articulation of the bar members on a vehicle part, which can usually only be accomplished indirectly. For this purpose, the stabilizer bar members are in each case equipped with a member end piece which is bent off elastically compliantly and can be fitted moveably on the corresponding vehicle part.

7 Claims, 1 Drawing Sheet

STABILIZER FOR MOTOR VEHICLES WITH ELASTICALLY COMPLIANT LONGITUDINAL STABILIZER MEMBER

BACKGROUND AND SUMMARY OF THE INVENTION

The invention relates to a stabilizer arrangement for a motor vehicle which includes a torsion bar extending transversely of the motor vehicle and longitudinal stabilizer members connected at respective opposite ends of the torsion bar.

The free and of stabilizer members of such stabilizers can, depending on the given installation possibilities be moveably connected directly or indirectly to a corresponding vehicle part, for example, a part of the wheel suspension.

In the latter case, the stabilizer members are in each case the vehicle part assigned to them (Fahrwerktechnik (Chassis Engineering), J. Reimpell, 4th edition, page 377).

An object of the invention is to improve a stabilizer arrangement of the type described above in such a way that it is possible to dispense with the use of appropriate connecting elements for the articulation of the stabilizer members on a vehicle part, which can usually only be accomplished indirectly.

This object is achieved according to the invention by providing an arrangement wherein the connecting elements are in each case connected integrally to the stabilizer members and are formed by a member end piece which is of tensionally and compressively rigid design and is bent off elastically compliantly from the member in the direction of the corresponding vehicle part.

Consequently, in the case of the stabilizer designed according to the invention, the elastically compliantly angled-off end pieces of the stabilizer members replace the connecting elements. The invention makes it possible to reduce considerably the technical complexity, allowing the assembly work necessary for the installation of the stabilizer to b accomplished much more easily and quickly. At the same time, the stabilizer members can be inexpensively brought into the contour necessary for their attachment.

Furthermore, the invention offers the possibility of producing the stabilizer as a shaped part from one piece, provided that the necessary material cross-sections allow this. However, depending on the stresses to be expected of torsion bar and stabilizer members it is expedient according to certain preferred embodiments to design the construction with the stabilizer members formed by shaped parts attached fixedly in terms of rotation onto the torsion bar. In this case, different, inexpensive material grades, corresponding to the requirements, can be paired for torsion bar and stabilizer members.

From a production engineering point of view, this construction offers the particular advantage that the stabilizer members, to be produced with appropriate cross-sections, can be brought into the necessary shape quickly and exactly by means of suitable tools.

The stabilizer members can in this case be produced from flat, round or square material, from tube or by shaped parts of Plastic. At the same time, these members can, in particular if they are made of round material, be provided with different cross-sections over their length, adapted to the loads to be expected. The attachment of the bent-off end piece of the stabilizer members to the corresponding vehicle part may be accomplished in a variety of ways, for example by screwing on. In this respect, especially preferred embodiments provide a bearing element which is in each case integrally attached to the bent-off member end piece of the stabilizer member. Reference is also made to the below listed U.S. patent applications:

(i) U.S. application Ser. No. 242,802, filed Sept. 12, 1988, based on German application No. P 37 30 338.4, filed in Germany on Sept. 10, 1987;

(ii) U.S. application Ser. No. 242,803, filed Sept. 12, 1988, based on German application No. P 37 30 336.8, filed in Germany on Sept. 10, 1987; and (iii) U.S. application Ser. No. 242,801, filed Sept. 12, 1988, based on German application No. P 37 30 337.6, filed in Germany on Sept. 10, 1987.

Other objects, advantages and novel features of the present invention will become apparent from the following detailed description of the invention when considered in conjunction with the accompanying drawings.

DETAILED DESCRIPTION OF THE DRAWINGS

Figure 1:
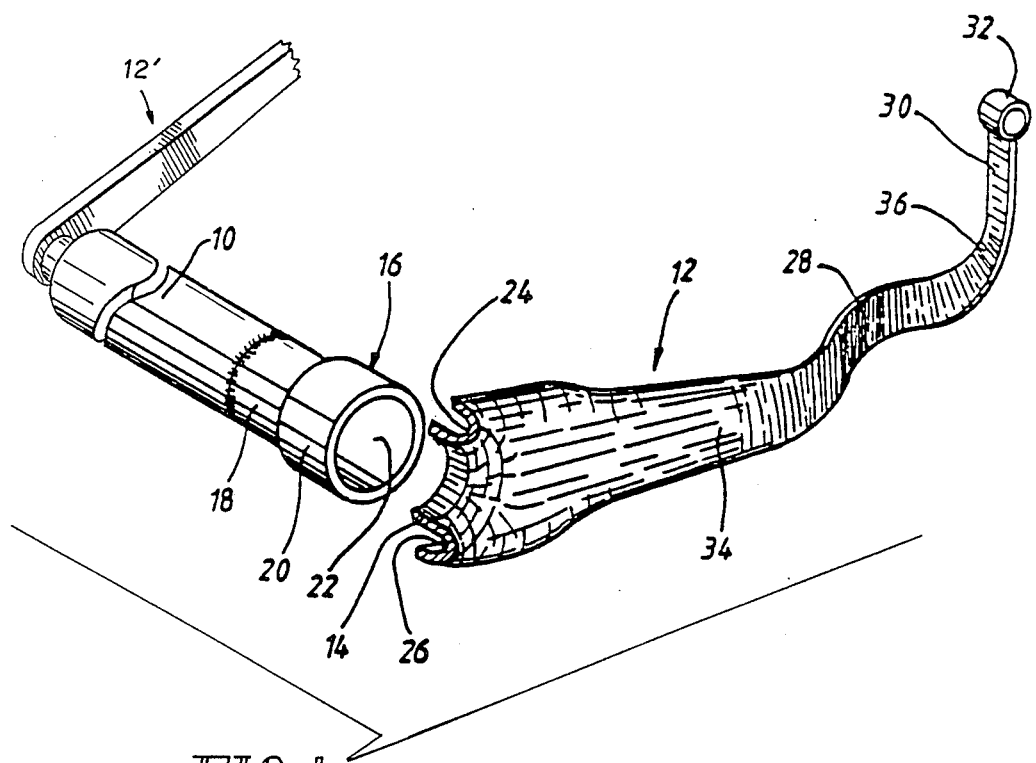
FIG. 1 a schematic exploded perspective part sectional view illustrating a preferred embodiment of the present invention and, FIG 1A is a partial sectional schematic view showing a modified connecting structure for a stabilizer bearing eye of the FIG. 1 embodiment.

Referring to the drawing, 10 denotes a cylindrical torsion bar, for example solidly designed, at the bar ends of which a stabilizer member 12 is in each case attached fixedly in terms of rotation. The torsion bar 10 may also have a cross-sectional profile differing from the cylindrical shape or be of tubular design according to other contemplated embodiments. In the latter case, it may be a seamlessly drawn or welded tube, with the advantage that the tube makes a problem-free crack or surface examination possible even on the inner tube circumference.

For the sake of simplicity, only one of the stabilizer members 12 is shown in detail with the other member 12' only schematically depicted at the left end of the torsion bar 10. This is formed as a shaped part from sheet steel, at the member end of which to be connected to the torsion bar 10 there is a neck-shaped cylindrical extension 14, which is passed through on the side of the member facing the bar end concerned.

The interconnection of the torsion bar 10 and the rear end of the stabilizer member 12 having the neck-like extension 14 is effected, in the shown example, by a connecting piece 16, which is provided between the two parts and the one end part 18 of which is designed as a solid, cylindrical extension with flat end face and the other end part 20 of which is of hollow-cylindrical design. The inside diameter of the hollow-cylindrical end part 20 is appropriately matched to the outside diameter of the neck-like extension 14 for the purpose of substantially play-free engagement of the latter in the end part 20.

There are a number of contemplated ways of fixing the connecting piece 16 on the torsion bar 10. The same can be connected by its flat end face to a likewise flat end face of the torsion bar 10, for example by friction welding or eddy-current welding. The neck-like extension 14 of the stabilizer member 12 may be connected fixedly in terms of rotation in the opening 22 of the end part 20 of the connecting piece 16, for example by pressing, shrinking, bonding or, if appropriate, by welding.

To achieve the necessary flexural rigidity, the stabilizer members 12 may, as is shown for example by the cross-section of their end part, be profiled in a suitable way, for example be provided over a part of their length with edge beads 24 and 26.

The stabilizer members 12 may, furthermore, also be deformed transversely to their longitudinal direction, as the member section 28 illustrates, in order to go around vehicle parts installed in their area, for example chassis parts. The deformation may, for example, be constituted by an angling-off, bending and/or cranking.

The stabilizer discussed is suitable for uses in which connecting elements in the form of an appropriate linkage are usually to be provided between the stabilizer members and th vehicle parts to be connected to them.

Figure 1A:
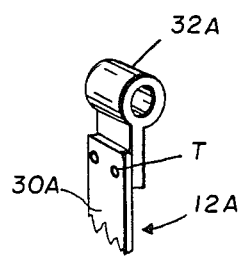

In order to be able to dispense with the arrangement of such special connecting elements, in their place there is provided in each case an elastically compliantly bent-off rigid member end piece 30, which can be fixed, for example pivotally moveably, by its free end on the appropriate vehicle part For this purpose, on the free end of the member end piece 30 there is integrally attached, for example, a bearing eye 32, which is to be, for example, appropriately drilled out and, if appropriate, provided with an internal thread. Equally, a journal or the like may be provided as a bearing element. FIG. 1A schematically depicts connection of the bent off portion 30A of a stabilizer member 12 to a bearing eye section 32A via means of a threaded connection T.

The elastically compliant connection of the rigid member end piece 30 to the remaining part 34 of the stabilizer member 12 is created by a transition section 36, which is for example somewhat bow-shaped and the cross-section of which corresponds approximately to that of the member subpiece adjoining it, in the present case of the member section 28. This transition section 36 is assigned to the member section 28 in such a way that its moment of resistance with respect to that of the remaining member part 28, 34 is many times less. For this purpose, the transition section 36 is, for example, twisted relative to the neighboring member section 28, the preferably rectangular cross section of which has its largest dimension in the plane of movement of the stabilizer member 12, in such a way that the largest dimension of its equally for example rectangular cross-section is positioned relative to the largest cross-section dimension of the member section 28 approximately at an attitude of 90°.

The member end pieces 30 of the stabilizer may either be connected in each case to a moveable wheel suspension part of a vehicle axle, in this case the torsion bar 10 being rotatably mounted on the vehicle body, or the member end pieces 30 may be mounted on the vehicle body and the torsion bar 10 fixed on the moveable vehicle axle, as is usually the case with rigid axles.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Stabilizer arrangement for motor vehicles, with a torsion bar extending in transverse direction of the vehicle and having at each end a stabilizer member extending approximately in longitudinal direction of the vehicle, which stabilizer members are in each case connected moveably via a connecting element held compliantly in the region of their free respect to the stabilizer member and executes springing movements, wherein the connecting elements are in each case connected integrally to the stabilizer members and are formed by a member end piece which is of tensionally and compressively rigid design and is bent off elastically compliantly from said member in the direction of the corresponding vehicle part.

2. Stabilizer arrangement according to claim 1, wherein the stabilizer members are formed by shaped parts attached fixedly in terms of rotation onto the torsion bar.

3. Stabilizer arrangement according to claim 1, wherein a bearing element is in each case integrally attached to the bent-off member end piece of the stabilizer member.

4. Stabilizer arrangement according to claim 3, wherein said bearing element is in each case threadedly connected integrally to the bent-off member end piece of the stabilizer member.

5. Stabilizer arrangement according to claim 2, wherein a bearing element is in each case integrally attached to the bent-off member end piece of the stabilizer member.

6. Stabilizer arrangement according to claim 5, wherein said bearing element is in each case threadedly connected integrally to the bent-off member end piece of the stabilizer member.

7. Stabilizer arrangement according to claim 1, wherein said stabilizer members are designed to accommodate dispensing with connection linkages for the articulation of the bar members on a vehicle part.

* * * * *